(12) United States Patent
Ljung et al.

(10) Patent No.: US 11,503,597 B2
(45) Date of Patent: Nov. 15, 2022

(54) USER EQUIPMENT CAPABILITY REPORTING BASED ON DETECTED FREQUENCY BANDS

(71) Applicant: Sony Corporation, Tokyo (JP)

(72) Inventors: Rickard Ljung, Lund (SE); Magdalena Akke, Lund (SE)

(73) Assignee: Sony Group Corporation, Tokyo (JP)

( * ) Notice: Subject to any disclaimer, the term of this patent is extended or adjusted under 35 U.S.C. 154(b) by 54 days.

(21) Appl. No.: 17/047,203

(22) PCT Filed: May 11, 2018

(86) PCT No.: PCT/US2018/032234
§ 371 (c)(1),
(2) Date: Oct. 13, 2020

(87) PCT Pub. No.: WO2019/216908
PCT Pub. Date: Nov. 14, 2019

(65) Prior Publication Data
US 2021/0127393 A1    Apr. 29, 2021

(51) Int. Cl.
*H04W 72/04* (2009.01)
*H04W 8/24* (2009.01)
*H04W 48/16* (2009.01)

(52) U.S. Cl.
CPC ......... *H04W 72/0453* (2013.01); *H04W 8/24* (2013.01); *H04W 48/16* (2013.01)

(58) Field of Classification Search
CPC ..... H04W 48/16; H04W 48/18; H04W 48/20; H04W 88/06; H04W 48/12; H04W 16/14; H04W 24/10; H04W 48/14; H04W 74/0833; H04W 24/02; H04W 64/00; H04W 48/10; H04W 74/0808;
(Continued)

(56) References Cited

U.S. PATENT DOCUMENTS

| 2009/0168662 A1* | 7/2009 | Tsuboi | H04L 1/20 370/252 |
| 2011/0122801 A1 | 5/2011 | Franklin et al. | |
| 2012/0034917 A1* | 2/2012 | Kazmi | H04W 48/16 455/434 |

(Continued)

FOREIGN PATENT DOCUMENTS

WO    2018/063817 A1    4/2018

OTHER PUBLICATIONS

International Search Report and Written Opinion for corresponding International Application No. PCT/US2018/032234 dated Nov. 2, 2018.
(Continued)

*Primary Examiner* — Daniel Lai
(74) *Attorney, Agent, or Firm* — Renner, Otto, Boisselle & Sklar, LLP

(57) ABSTRACT

A mobile electronic device is provided. The mobile electronic device comprises a wireless modem configured to enable communication with at least one radio network node in a mobile communication network. The mobile electronic device also comprises a processor configured to cause the wireless modem to scan one or more frequency bands, assemble a first capability report based on the scan of the one or more frequency bands, and cause the wireless modem to transmit the first capability report to at least one radio network node in the mobile communication network.

18 Claims, 7 Drawing Sheets

(58) Field of Classification Search
CPC ............ H04W 72/1278; H04W 28/06; H04W 36/0061; H04W 74/0816; H04W 40/246; H04W 40/248; H04W 72/0453; H04W 8/24; Y02D 10/00; H04L 5/001; H04L 5/0064; H04L 5/0092; H04L 27/0006
See application file for complete search history.

(56) References Cited

U.S. PATENT DOCUMENTS

| | | | |
|---|---|---|---|
| 2015/0003407 A1* | 1/2015 | Seo ..................... | H04W 24/00 370/330 |
| 2015/0264637 A1 | 9/2015 | Zaus et al. | |
| 2015/0296391 A1* | 10/2015 | Kotkar ................. | H04W 24/02 370/254 |
| 2019/0281604 A1* | 9/2019 | Kim ..................... | H04W 72/12 |

OTHER PUBLICATIONS

3 Generation Partnership Project; Technical Specification Group Radio Access Network; Evolved Universal Terrestrial Radio Access (E-UTRA); User Equipment (UE) procedures in idle mode (Release 14), 3GPP Standard; Technical Specification; 3GPP TS 36.304, 3rd Generation Partnership Project (3GPP), Mobile Competence Centre; 650, Route Des Lucioles; F-06921 Sophia-Antipolis Cedex; France, vol. RAN WG2, No. V14.6.0, Apr. 2, 2018 (Apr. 2, 2018), pp. 1-50, XP051450722, [retrieved on Apr. 2, 2018] Paragraph "5.1.2 Support for PLMN selection" Paragraph "5.2.3 Cell Selection process".

\* cited by examiner

| E-UTRA Operating Band | Uplink (UL) operating band BS receive UE transmit $F_{UL\_low} - F_{UL\_high}$ | | | Downlink (DL) operating band BS transmit UE receive $F_{DL\_low} - F_{DL\_high}$ | | |
|---|---|---|---|---|---|---|
| 1 | 1920 MHz | – | 1980 MHz | 2110 MHz | – | 2170 MHz |
| 2 | 1850 MHz | – | 1910 MHz | 1930 MHz | – | 1990 MHz |
| 3 | 1710 MHz | – | 1785 MHz | 1805 MHz | – | 1880 MHz |
| 4 | 1710 MHz | – | 1755 MHz | 2110 MHz | – | 2155 MHz |
| 5 | 824 MHz | – | 849 MHz | 869 MHz | – | 894 MHz |
| 6[1] | 830 MHz | – | 840 MHz | 875 MHz | – | 885 MHz |
| 7 | 2500 MHz | – | 2570 MHz | 2620 MHz | – | 2690 MHz |
| 8 | 880 MHz | – | 915 MHz | 925 MHz | – | 960 MHz |
| 9 | 1749.9 MHz | – | 1784.9 MHz | 1844.9 MHz | – | 1879.9 MHz |
| 10 | 1710 MHz | – | 1770 MHz | 2110 MHz | – | 2170 MHz |
| 11 | 1427.9 MHz | – | 1447.9 MHz | 1475.9 MHz | – | 1495.9 MHz |
| 12 | 699 MHz | – | 716 MHz | 729 MHz | – | 746 MHz |
| 13 | 777 MHz | – | 787 MHz | 746 MHz | – | 756 MHz |
| 14 | 788 MHz | – | 798 MHz | 758 MHz | – | 768 MHz |
| 15 | Reserved | | | Reserved | | |
| 16 | Reserved | | | Reserved | | |
| 17 | 704 MHz | – | 716 MHz | 734 MHz | – | 746 MHz |
| 18 | 815 MHz | – | 830 MHz | 860 MHz | – | 875 MHz |
| 19 | 830 MHz | – | 845 MHz | 875 MHz | – | 890 MHz |
| 20 | 832 MHz | – | 862 MHz | 791 MHz | – | 821 MHz |
| 21 | 1447.9 MHz | – | 1462.9 MHz | 1495.9 MHz | – | 1510.9 MHz |
| 22 | 3410 MHz | – | 3490 MHz | 3510 MHz | – | 3590 MHz |
| 23[1] | 2000 MHz | – | 2020 MHz | 2180 MHz | – | 2200 MHz |
| 24 | 1626.5 MHz | – | 1660.5 MHz | 1525 MHz | – | 1559 MHz |
| 25 | 1850 MHz | – | 1915 MHz | 1930 MHz | – | 1995 MHz |
| 26 | 814 MHz | – | 849 MHz | 859 MHz | – | 894 MHz |
| 27 | 807 MHz | – | 824 MHz | 852 MHz | – | 869 MHz |
| 28 | 703 MHz | – | 748 MHz | 758 MHz | – | 803 MHz |
| 29 | N/A | | | 717 MHz | – | 728 MHz |
| 30[15] | 2305 MHz | – | 2315 MHz | 2350 MHz | – | 2360 MHz |
| 31 | 452.5 MHz | – | 457.5 MHz | 462.5 MHz | – | 467.5 MHz |
| 32 | N/A | | | 1452 MHz | – | 1496 MHz |
| 33 | 1900 MHz | – | 1920 MHz | 1900 MHz | – | 1920 MHz |
| 34 | 2010 MHz | – | 2025 MHz | 2010 MHz | – | 2025 MHz |
| 35 | 1850 MHz | – | 1910 MHz | 1850 MHz | – | 1910 MHz |
| 36 | 1930 MHz | – | 1990 MHz | 1930 MHz | – | 1990 MHz |
| 37 | 1910 MHz | – | 1930 MHz | 1910 MHz | – | 1930 MHz |
| 38 | 2570 MHz | – | 2620 MHz | 2570 MHz | – | 2620 MHz |
| 39 | 1880 MHz | – | 1920 MHz | 1880 MHz | – | 1920 MHz |
| 40 | 2300 MHz | – | 2400 MHz | 2300 MHz | – | 2400 MHz |
| 41 | 2496 MHz | – | 2690 MHz | 2496 MHz | – | 2690 MHz |
| 42 | 3400 MHz | – | 3600 MHz | 3400 MHz | – | 3600 MHz |
| 43 | 3600 MHz | – | 3800 MHz | 3600 MHz | – | 3800 MHz |
| 44 | 703 MHz | – | 803 MHz | 703 MHz | – | 803 MHz |
| 45 | 1447 MHz | – | 1467 MHz | 1447 MHz | – | 1467 MHz |
| 46 | 5150 MHz | – | 5925 MHz | 5150 MHz | – | 5925 MHz |

Fig. 1a

| | | | | | | |
|---|---|---|---|---|---|---|
| 47 | 5855 MHz | – | 5925 MHz | 5855 MHz | – | 5925 MHz |
| 48 | 3550 MHz | – | 3700 MHz | 3550 MHz | – | 3700 MHz |
| 49 | 3550 MHz | – | 3700 MHz | 3550 MHz | – | 3700 MHz |
| 50 | 1432 MHz | - | 1517 MHz | 1432 MHz | - | 1517 MHz |
| 51 | 1427 MHz | - | 1432 MHz | 1427 MHz | - | 1432 MHz |
| 65 | 1920 MHz | – | 2010 MHz | 2110 MHz | – | 2200 MHz |
| 66 | 1710 MHz | – | 1780 MHz | 2110 MHz | – | 2200 MHz |
| 67 | | N/A | | 738 MHz | – | 758 MHz |
| 68 | 698 MHz | – | 728 MHz | 753 MHz | – | 783 MHz |
| 69 | | N/A | | 2570 MHz | – | 2620 MHz |
| 70 | 1695 MHz | – | 1710 MHz | 1995 MHz | – | 2020 MHz |
| 71 | 663 MHz | – | 698 MHz | 617 MHz | – | 652 MHz |
| 72 | 451 MHz | – | 456 MHz | 461 MHz | – | 466 MHz |
| 73 | 450 MHz | – | 455 MHz | 460 MHz | – | 465 MHz |
| 74 | 1427 MHz | – | 1470 MHz | 1475 MHz | – | 1518 MHz |
| 75 | | N/A | | 1432 MHz | – | 1517 MHz |
| 76 | | N/A | | 1427 MHz | – | 1432 MHz |

Fig. 1b

CA combinations for a UE supporting 4
bands and up to 3 CA:

| | |
|---|---|
| 1, 1 | 1, 2, 3 |
| 1, 2 | 1, 2, 4 |
| 1, 3 | 1, 3, 4 |
| 1, 4 | 2, 2, 2 |
| 2, 2 | 2, 2, 3 |
| 2, 3 | 2, 2, 3 |
| 2, 4 | 2, 2, 4 |
| 3, 3 | 2, 3, 3 |
| 3, 4 | 2, 3, 4 |
| 4, 4 | 2, 4, 4 |
| 1, 1, 1 | 3, 3, 3 |
| 1, 1, 2 | 3, 3, 4 |
| 1, 1, 3 | 3, 4, 4 |
| 1, 1, 4 | 4, 4, 4 |
| 1, 2, 2 | |

Fig. 2

USER EQUIPMENT CAPABILITY REPORTING BASED ON DETECTED FREQUENCY BANDS

TECHNICAL FIELD OF THE INVENTION

The technology of the present disclosure relates generally to mobile electronic devices and transmission equipment operable in a mobile communication network, and more particularly to devices and methods of dynamic capability reporting of a mobile electronic device in a mobile communication network.

DESCRIPTION OF THE RELATED ART

Cellular mobile communication networks utilize various different $3^{rd}$ Generation Partnership Project (3GPP) systems, such as Wideband Code Division Multiple Access (WCDMA), Long Term Evolution (LTE) and upcoming New Radio (NR) standards, among others that operate in various frequency bands. Mobile electronic devices that operate in such mobile communication networks, are ever increasing in popularity.

Prior to operating in the mobile communication network, these devices, also known as terminals, mobile stations and/or user equipment (UE), typically register to the network by initiating communication with the radio network node of whichever cell the UE is in. Registration typically includes transmitting information, such as which radio access functionalities and features the UE supports, to the network, such as via UE capability signaling and UE feature group indicator (FGI) signaling. UE capability signaling is specified in TS 36.306 of the 3GPP specification and typically consists of a list within the order of 100 different indicators on whether certain functions are supported or not.

When UE capability signaling was first introduced, a typical UE supported only a handful of frequency bands. In the current state of the art, however, UE's can support in the order of 30 bands and that number is increasing with each modem chipset generation. Currently, there are more than 60 different frequency bands defined in the standards for LTE alone. FIG. 1 depicts an example list of frequency bands for LTE (copied from 3GPP TS 36.101).

Over time, the utilization of these mobile communication systems has changed. Not only are consumers and their terminals moving and, over time, accessing different cells in the mobile communication network that may support different systems or technologies, but the technologies supported by the terminals themselves vary over time. New terminals entering the market support ever increasing feature sets such as additional radio access technologies and additional frequency bands. Additionally, the introduction of Carrier Aggregation (CA), the combined usage of multiple carriers in one or more frequency bands, creates new obstacles for UE capability signaling. With CA, an operator can offer a larger total bandwidth to a UE than the bandwidth of a single transmission. In, for example, LTE, the maximum carrier bandwidth is 20 MHz, but due to license regulations, many live networks operate with carrier bandwidths of 5-20 MHz. In order to offer wider bandwidths to UE's, operators have deployed CA, and can thus offer 2-3 combined carriers. It is expected that soon many networks and UE's will typically support at least 4-5 carriers. In current versions of 3GPP standards, theoretically up to 32 carriers may be combined. Even though no such work is initiated as of now, the maximum number of carriers possible to combine may be even larger in coming releases of standards.

The UE capability report may indicate which CA combinations the UE can support for a given radio access technology. CA combinations for multiple radio access technologies can be provided separately in the capability signaling. For example, FIG. 2 depicts an example list of supported CA band combinations for a UE supporting 4 bands and up to 3 CA between any combination of these bands for one radio access technology. A person skilled in the art of mathematics may calculate the possible size of the band combination list for any other example (e.g., for a UE supporting 40 bands with 5 carrier CA), and also appreciate that the size of the band combination list may be multiplied in a case where the UE supports CA for more than one radio access technology.

It is clear that the size of a UE capability report including band combinations for CA becomes very large when the number of supported bands and combinations increase and when the UE supports CA for multiple radio access technologies. Furthermore, the increase in size due to band combinations may be exponentially scaling with the number of aggregated carriers supported by the UE.

This load and technology variation may make UE capability reports very large. Most networks are unable to support such large UE capability reports due to previous implementation of standardized protocols, when such large signaling messages were not an issue. New radio network nodes can be added to the network or existing radio network nodes can be upgraded to accommodate larger UE capability reports. Also, modifications have been implemented in the 3GPP protocols (E.g. 36.331 Release 11) to avoid large sizes of UE capability reports from the UE. For example, in attempts to reduce the size of UE capability reports, the radio communication protocol in the radio network nodes may be upgraded to request that the UE capability report include information regarding specific frequency bands which are of interest for the network in the band combination information within the UE capability report. When a UE receives this request prior to a UE capability report transmission the UE is expected to limit the UE capability report in order that the band combination part of the report only is based on frequency band combinations that include at least one of the frequency bands requested by the network node.

SUMMARY

To be able to communicate with many versions of networks, independent of whether the functionality described above is supported or not, a need arises to limit the general size of the UE capability report. For example, the UE may not provide the complete list of supported band combinations but may instead provide a list of band combinations adapted towards the currently utilized network. Alternative solutions available to limit the size of the UE capability report include methods to analyze the mobile country code of the currently utilized network and report only combinations of frequency bands the UE determines may be allocated to the network. Such information may be available in the UE via a database of network frequency band utilization information. However, this method requires periodic upgrades of such databases since it needs to handle changes in the network usage over time, and since frequency band usage and network capabilities of carrier aggregation and other functionality may change over time. Nonetheless, the limited UE capability report according to this method may still be too large.

An object of the present invention, therefore, is to implement a solution for a dynamic UE capability reporting that works in all network regions worldwide and does not rely on updated radio network node software or updated databases of frequency bands used in relevant regions or networks. The present invention relates to UE capability reporting and a method of transmitting short but relevant reports to all available types of radio network nodes within the full life time of the UE.

As described in detail herein, UE capability report size may be significantly reduced when the UE creates and reports UE capabilities, such as frequency band combinations for CA, based on its own list of detected frequency bands used by the mobile network with which it is capable of communicating, instead of reporting the total list of all supported band combinations or those requested by the mobile network. This may be applicable to all mobile networks independently of the radio network node software implementation and release compliance.

Accordingly, in one aspect of the invention a mobile electronic device is provided. The mobile electronic device comprises a wireless modem. The mobile electronic device also comprises a processor configured to cause the wireless modem to scan one or more frequency bands, assemble a first capability report based on the one or more scanned frequency bands, and cause the wireless modem to transmit the first capability report.

In an embodiment, the first capability report comprises capability information indicating whether the mobile electronic device is capable of communicating on: a) the one or more scanned frequency bands, and/or b) at least one combination of two or more frequency bands, the at least one combination including at least one of the one or more scanned frequency bands.

In another embodiment, the processor is configured to identify at least one frequency band of the one or more scanned frequency bands that is used by a predetermined mobile communication network, and assemble the first capability report based on the at least one frequency band identified as used by the predetermined mobile communication network.

In yet another embodiment, the first capability report comprises capability information indicating whether the mobile communication device is capable of communicating on only: a) the at least one frequency band identified as used by the predetermined mobile communication network, and/or b) at least one combination of two or more frequency bands, the at least one combination including at least one of the at least one frequency band identified as used by the predetermined mobile communication network.

In another embodiment, the at least one frequency band identified as used by the predetermined mobile communication network includes at least two frequency bands used by two or more mobile network cells having a common network identity.

In another embodiment, the at least one frequency band identified as used by the predetermined mobile communication network includes at least two frequency bands used by two or more mobile network cells utilizing at least one common predetermined radio access technology.

In yet another embodiment, the processor is configured to scan the one or more frequency bands to select a suitable cell for the mobile electronic device to camp on. Upon selecting a suitable cell, the processor is configured to cause the mobile electronic device to camp on the selected suitable cell.

In an embodiment, the processor is configured to perform an additional scan of one or more additional frequency bands after a predetermined time has elapsed, assemble a second, new capability report based on the one or more additional scanned frequency bands, and cause the wireless modem to transmit the second, new capability report.

In another embodiment, the processor comprises a memory configured to store the first capability report and/or the second, new capability report on the mobile electronic device.

In another embodiment, when the processor causes the mobile electronic device to camp on the selected suitable cell for at least a second time, the processor is configured to retrieve the first capability report or the second, new capability report from the memory, and cause the wireless modem to transmit the first capability report or the second, new capability report retrieved from the memory.

In another aspect of the invention, a method for capability reporting of a mobile electronic device is provided. The method comprises scanning one or more frequency bands, assembling a first capability report based on the one or more scanned frequency bands, and transmitting the first capability report.

In an embodiment of the method, the first capability report comprises capability information indicating whether the mobile electronic device is capable of communicating on: a) the one or more scanned frequency bands, and/or b) at least one combination of two or more frequency bands, the at least one combination including at least one of the one or more scanned frequency bands.

In another embodiment of the method, the method further comprises identifying at least one frequency band of the one or more scanned frequency bands that is used by a predetermined mobile communication network. In this embodiment, the assembling comprises assembling the first capability report based on the at least one frequency band identified as used by the predetermined mobile communication network.

In another embodiment of the method, the first capability report comprises capability information indicating whether the mobile communication device is capable of communicating on only: a) at least one frequency band identified as used by the predetermined mobile communication network, and/or b) at least one combination of two or more frequency bands, the at least one combination including at least one of the at least one frequency band identified as used by the predetermined mobile communication network.

In yet another embodiment of the method, the at least one frequency band identified as used by the predetermined mobile communication network includes at least two frequency bands used by two or more mobile network cells that a) utilize at least one common predetermined radio access technology, or b) have a common network identity.

In another embodiment of the method, the scanning includes scanning the one or more frequency bands to select a suitable cell for the mobile electronic device to camp on. Upon selecting a suitable cell, the method comprises camping the mobile electronic device on the selected suitable cell.

In another embodiment of the method, the method further comprises performing an additional scan of one or more additional frequency bands after a predetermined time has elapsed, assembling a second, new capability report based on the one or more additional scanned frequency bands, and transmitting the second, new capability report.

In another embodiment of the method, the method further comprises storing the first capability report or the second, new capability report in a memory on the mobile electronic device.

In yet another embodiment of the method, when the mobile electronic device is camped on the selected suitable cell for at least a second time, the method further comprises retrieving the first capability report or the second, new capability report from the memory, and transmitting the first capability report or the second, new capability report retrieved from the memory.

In another aspect of the invention, a non-transitory computer-readable medium storing program code is provided, which when executed performs the method of the present invention.

These and further features will be apparent with reference to the following description and attached drawings. In the description and drawings, particular embodiments have been disclosed in detail as being indicative of some of the ways in which principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

The terms "comprises" and "comprising," when used in this specification, are taken to specify the presence of stated features, integers, steps or components but do not preclude the presence or addition of one or more other features, integers, steps, components or groups thereof.

BRIEF DESCRIPTION OF THE DRAWINGS

FIG. 1a is a table depicting a list of frequency bands defined in 3GPP TS 36.101 for LTE.

FIG. 1b is the table depicting a list of frequency bands defined in 3GPP TS 36.101 for LTE, continued from FIG. 1a.

FIG. 2 is an exemplary list of band combinations with CA.

DETAILED DESCRIPTION OF EMBODIMENTS

Figure 3:
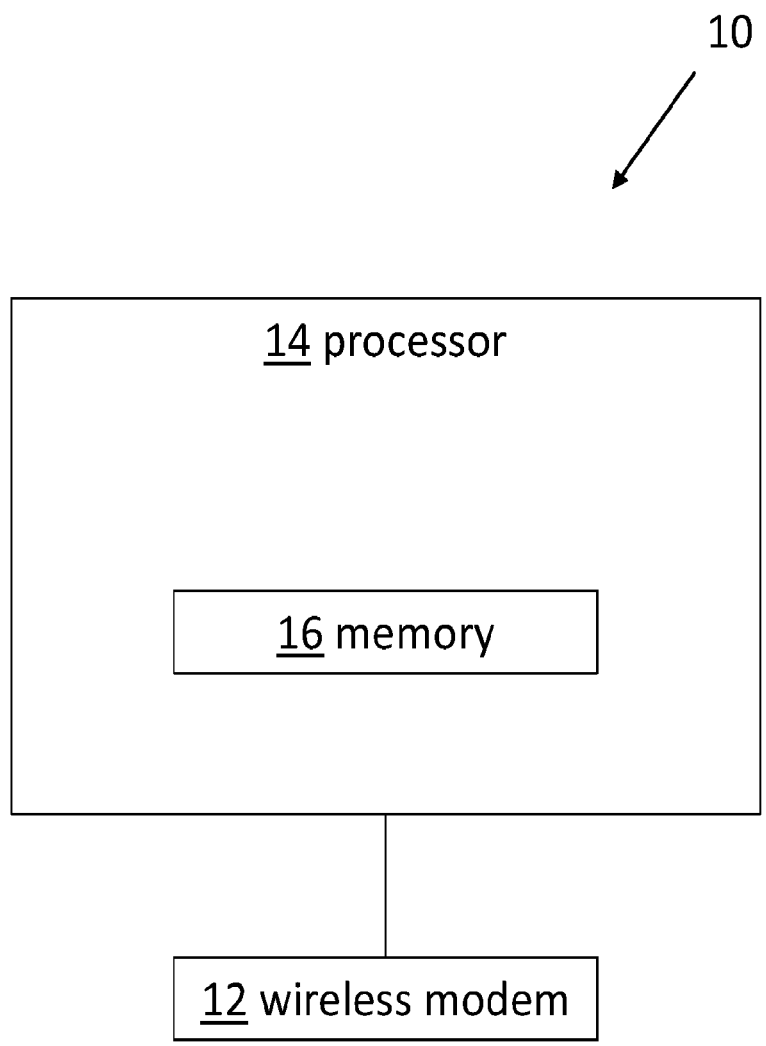
FIG. 3 is a schematic diagram of an exemplary mobile electronic device according to an aspect of the invention.

Embodiments of the present invention will now be described with reference to the drawings, wherein like reference numerals are used to refer to like elements throughout. It will be understood that the figures are not necessarily to scale.

FIG. 3 depicts a schematic block diagram of an exemplary UE, depicted as mobile electronic device 10. The device 10 may be of any type, such as for example a mobile telephone or smartphone, tablet computer, cellular-connected laptop computer or similar device. For the examples used herein, the device 10 may be a mobile smartphone operating in a mobile communication network. In a typical mobile communication network, devices such as these communicate via a radio access network (RAN) to one or more core networks.

Figure 4:
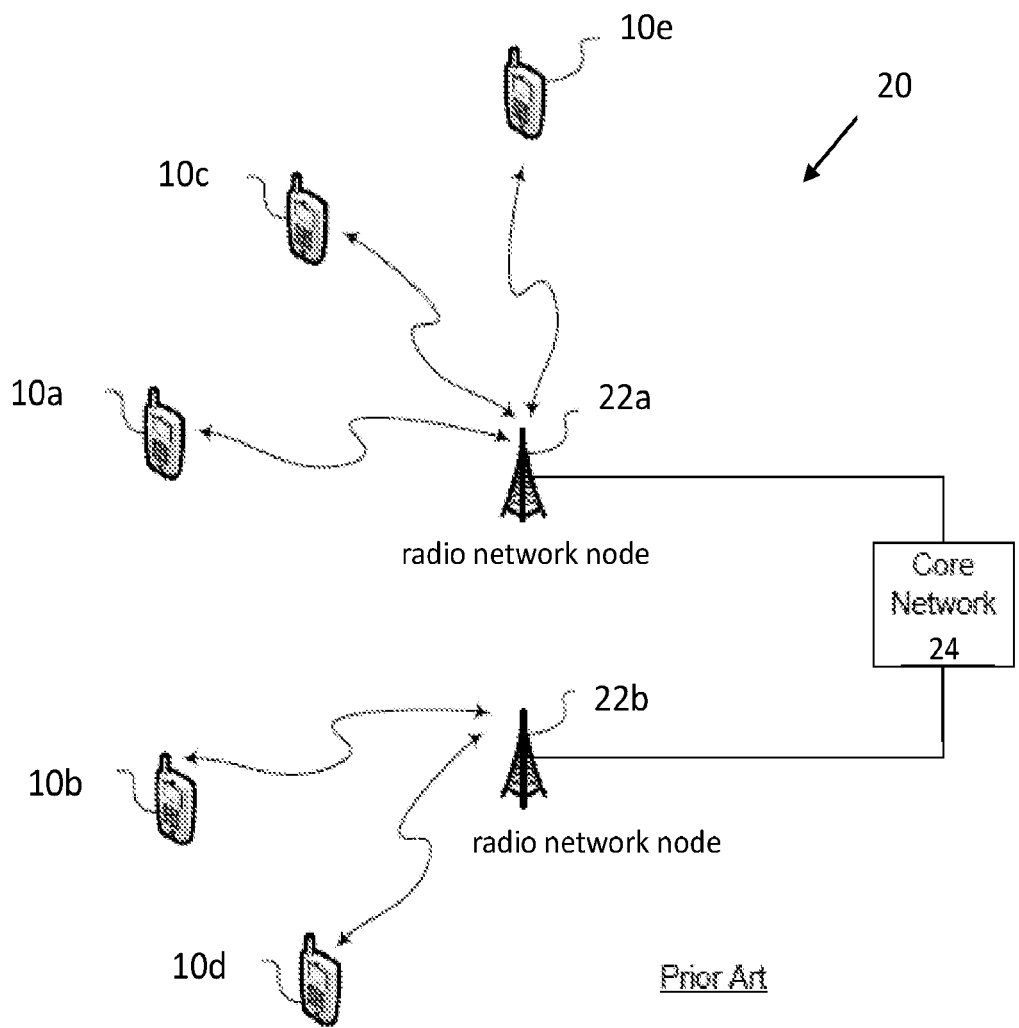
FIG. 4 is a schematic diagram of an exemplary radio access network (RAN).

The RAN covers a geographical area which may be divided into cell areas, with each cell area being served by a radio network node, e.g., a radio base station. FIG. 4 illustrates an exemplary RAN 20 that includes mobile electronic devices 10a, 10b, 10c, 10d, 10e and radio network nodes 22a, 22b. A cell is a geographical area where radio coverage is provided by a radio network node equipment such as, for example, radio network nodes 22a, 22b. Each cell is identified by an identity within the local radio area, which is broadcast in the cell from the radio network node 22a, 22b. The radio network nodes 22a, 22b communicate with devices 10a, 10b, 10c, 10d, 10e within the range of the associated radio network node 22a, 22b over the air interface, operating on radio frequency bands used by the RAN 20. The RAN 20 also includes the core network 24, which is the part of the mobile communication network that provides the various services to customers who are connected to the RAN 20. As an example, the devices 10a, 10c, and 10e communicate with the core network 24 via radio network node 22a, while the devices 10b and 10d communicate with the core network 24 via the radio network node 22b.

Accordingly, with reference back to FIG. 3, the device 10 includes at least one wireless modem 12 configured to enable communication with a radio network node in any mobile communication network in which the device 10 is to operate. The device 10 may also include a processor 14, and a memory 16 configured to carry out various functions of the device 10. The processor 14 may be, for example, a microprocessor, but may be any other type of control circuit. Further, the device 10 may include a plurality of other components, as will be described later with reference to FIG. 6.

The processor 14 may scan, using the wireless modem 12, one or more frequency bands within reach of the mobile electronic device. The one or more scanned frequency bands may include any frequency band within reach of the mobile electronic device 10, regardless of whether or not it is used by a particular predetermined mobile communication network in which the device 10 is to operate.

The processor 14 may be configured to scan the one or more frequency bands to select a suitable cell within a predetermined mobile communication network for the device 10 to camp on. This selection processes may be according to the cell selection as defined in TS 36.304 of the 3GPP specification. For example, the processor 14 may scan the one or more frequency bands to select a suitable cell according to the cell selection process defined in version 14.6.0 of the 3GPP specification. However other versions of that standard, other standards, or even non-standard selection processes may be suitable to select a suitable cell for the device 10 to camp on.

The order the frequency bands are scanned may be proprietary and is typically meant to find a suitable cell as fast as possible to minimize a user's wait for the device 10 to be usable in the predetermined mobile communication network. The processor 14 may scan for any suitable cell and, when found, the processor 14 may read the system information of the detected cell in order to conclude if it belongs to the relevant predetermined mobile communication network. Upon selecting a suitable cell within the predetermined mobile communication network, the processor 14 may cause the device 10 to camp on the selected suitable cell and register the device 10 to the predetermined mobile communication network.

In one embodiment, if the device 10 receives from the predetermined mobile communication network or the radio network node specifically requested frequency bands in a capability inquiry (and the size of the capability report including all requested frequency bands is small enough for the radio network node to receive), the device 10 may simply transmit the full capability report according to the 3GPP process, where the full capability report corresponds to the complete list of capabilities and frequency band combinations which the device 10 is capable of communicating on. If, however, the mobile communication network and/or radio network node is not upgraded with this function of specifically requested frequency bands, the device 10 may proceed according to the aspects of the present invention.

By scanning, using the wireless modem 12, one or more frequency bands within reach of the device 10, regardless of whether or not it is used by the predetermined mobile communication network, the processor 14 may identify a list of all scanned frequency bands used by any mobile communication network. As will be described in detail below, the processor 14 may then assemble a capability report based on this list, indicating which scanned frequency bands the device 10 is capable of communicating on. From the list of all scanned frequency bands within reach of the mobile electronic device, the processor is configured to identify at least one frequency band of the scanned frequency bands that is used by the predetermined mobile communication network in which the device 10 is to operate. In this way, as will also be described in detail below, the processor 14 may alternatively assemble a capability report indicating whether the device 10 is capable of communicating on only one or more frequency bands identified as used by a specific network identity, e.g. the network identity used by the predetermined mobile communication network to which the device is registered to or equivalents of such. A network identity may be a public land mobile network code (PLMN), but other network identities are possible. Equivalent identities may be networks which have different PLMNs but belong to a list of equivalent PLMNs, or may be a set of different PLMNs considered by the UE as allowed to be utilized or allowed for roaming. The report may also include other frequencies on which mobile networks have been found.

In various embodiments, the at least one frequency band identified as used by the predetermined mobile communication network may include at least two frequency bands used by two or more mobile network cells having a common network identity or utilizing at least one common predetermined radio access technology. For example, with CA capability reporting for a specific radio access technology, CA combinations including frequency bands using that radio access technology may be included. In another example, a capability report may include CA combinations with frequencies on which a specific network ID has been found. In some embodiments, the at least two frequency bands may be used by two or more mobile network cells having both a common network identity and utilizing at least one common predetermined radio access technology.

In an embodiment, the processor 14 may assemble a first capability report based on the one or more scanned frequency bands, including all frequency bands within reach of the device 10, regardless of whether they are used by the predetermined mobile communication network in which the device 10 is to operate. Basing the first capability report on the one or more scanned frequency bands may result in a first capability report that comprises capability information indicating whether the device 10 is capable of communicating on the one or more scanned frequency bands, and/or various combinations of two or more frequency bands due to CA, wherein the combinations include at least one of the one or more scanned frequency bands. For example, in this embodiment, if frequency bands A, B, and C were scanned, the capability report may include capability information indicating whether the device 10 is capable of communicating on band A, B, and/or C. When CA is implemented, the capability report may also include a list of various frequency band combinations that the device 10 is capable of communicating on. In the example above, the capability report may include capability information indicating whether the device 10 is capable of communicating on any combination of two or more frequency bands wherein the combination includes at least one of bands A, B, and/or C.

By basing the first capability report on the one or more scanned frequency bands, and thus including capability information regarding those scanned frequency bands, the size of the first capability report may be reduced. Specifically, the size of the first capability report may be smaller than it would be if the device 10 reported capability information regarding all frequency bands that the device 10 is capable of communicating on regardless of if they are within reach of the device 10 or scanned by the processor 14.

In an embodiment, the processor 14 may assemble the first capability report based more specifically on the at least one frequency band identified as used by the predetermined mobile communication network in which the device 10 is to operate. Basing the first capability report more specifically on the at least one frequency band identified as used by the predetermined mobile communication network may result in a first capability report that comprises capability information indicating whether the device 10 is capable of communicating on only the frequency bands identified as used by the predetermined mobile communication network, and/or various combinations of two or more frequency bands due to CA, wherein the combinations include at least one frequency band identified as used by the predetermined mobile communication network. For example, in this embodiment, if frequency bands A, B, and C were scanned, but only frequency bands A and B were identified as used by the predetermined mobile communication network, the capability report may include capability information regarding bands A and/or B. When CA is implemented, the capability report may also include a list of various frequency band combinations. In the example above, the capability report may include capability information indicating whether the device 10 is capable of communicating on any combination of two or more frequency bands wherein the combination includes at least one of A and/or B.

By basing the first capability report on the at least one frequency band identified as used by the predetermined mobile communication network and thus including capability information regarding those identified frequency bands, the size of the first capability report may be even more reduced. Specifically, the size of the capability report may be smaller than it would be if the device 10 reported capability information regarding all scanned frequency bands, as described in an earlier embodiment.

The processor 14 may cause the wireless modem 12 to transmit the first capability report to at least one radio network node in the predetermined mobile communication network. Over time, however, the device 10 may need to perform additional capability report updates due to various types of changes. For example, the device 10 may change the mobile communication network in which it operates, or the first capability report may have been very limited e.g. due to a very small amount of scanned frequency bands being used. Therefore, in an embodiment, the device 10 may need to transmit a new capability report to a new mobile communication network by performing the same functions as previously described at another point in time. In another example, the frequency bands that are used by a given mobile communication network may differ in various locations within the network, such as in cities or rural areas. Additionally, new frequency bands may be used by the mobile communication network over time upon various implementations and upgrades. Accordingly, in another embodiment, the processor 14 may perform an additional scan of one or more additional frequency bands after a predetermined time has elapsed. The predetermined time may be set to any length of time in order to consistently update the capability reporting.

Upon the additional scan, the processor 14 may assemble a second, new capability report based on the one or more additional scanned frequency bands. The processor 14 may be configured to identify at least one additional frequency band of the additional scanned frequency bands that is used by a predetermined mobile communication network and assemble the second, new capability report based more specifically on the at least one additional frequency band identified as used by the predetermined mobile communication network. The second, new capability report may comprise the same kind of information that the first capability report comprises, as previously described, including capability information indicating whether the device 10 is capable of communicating on the one or more additional scanned frequency bands, individually or in combination with one or more other frequency band. Alternatively, the second, new capability report may comprise capability information indicating whether the device 10 is capable of communicating on only the at least one additional frequency band identified as used by the predetermined mobile communication network, individually or in combination with one or more other frequency band. The processor 14 is then configured to cause the wireless modem 12 to transmit the second, new capability report to the at least one radio network node in the mobile communication network.

The memory 16 may store the first capability report and/or the second, new capability report on the device 10 when they are assembled by the processor 14. In an embodiment, when the processor 14 causes the mobile electronic device 10 to camp on the selected suitable cell for at least a second time, the processor 14 is configured to retrieve the first capability report or the second, new capability report from the memory 16. The processor 14 is then configured to cause the wireless modem 12 to transmit the first capability report or the second, new capability report retrieved from the memory 16 to the at least one radio network node in the mobile communication network.

For natural reasons (e.g., to save energy in the mobile device or a suitable mobile network has already been found before scanning all supported frequencies), the processor 14 may omit to scan one or more frequency bands that are in the mobile communication network. However, due to the implementation of the present invention, as described, where capability reports are assembled to include an indication of supported band combinations for CA, the present invention is still robust in terms of being capable of communicating and connecting to the mobile communication network without CA for any particular missed frequency band. Furthermore, upon updating the scan of frequency bands, any omitted frequency band will likely be scanned, detected, and included in the second, new capability report. In another embodiment, the processor 14 may increase the size of the capability reports over time, as various updates to the mobile communication network are implemented which support greater sized capability reports.

Figure 5:
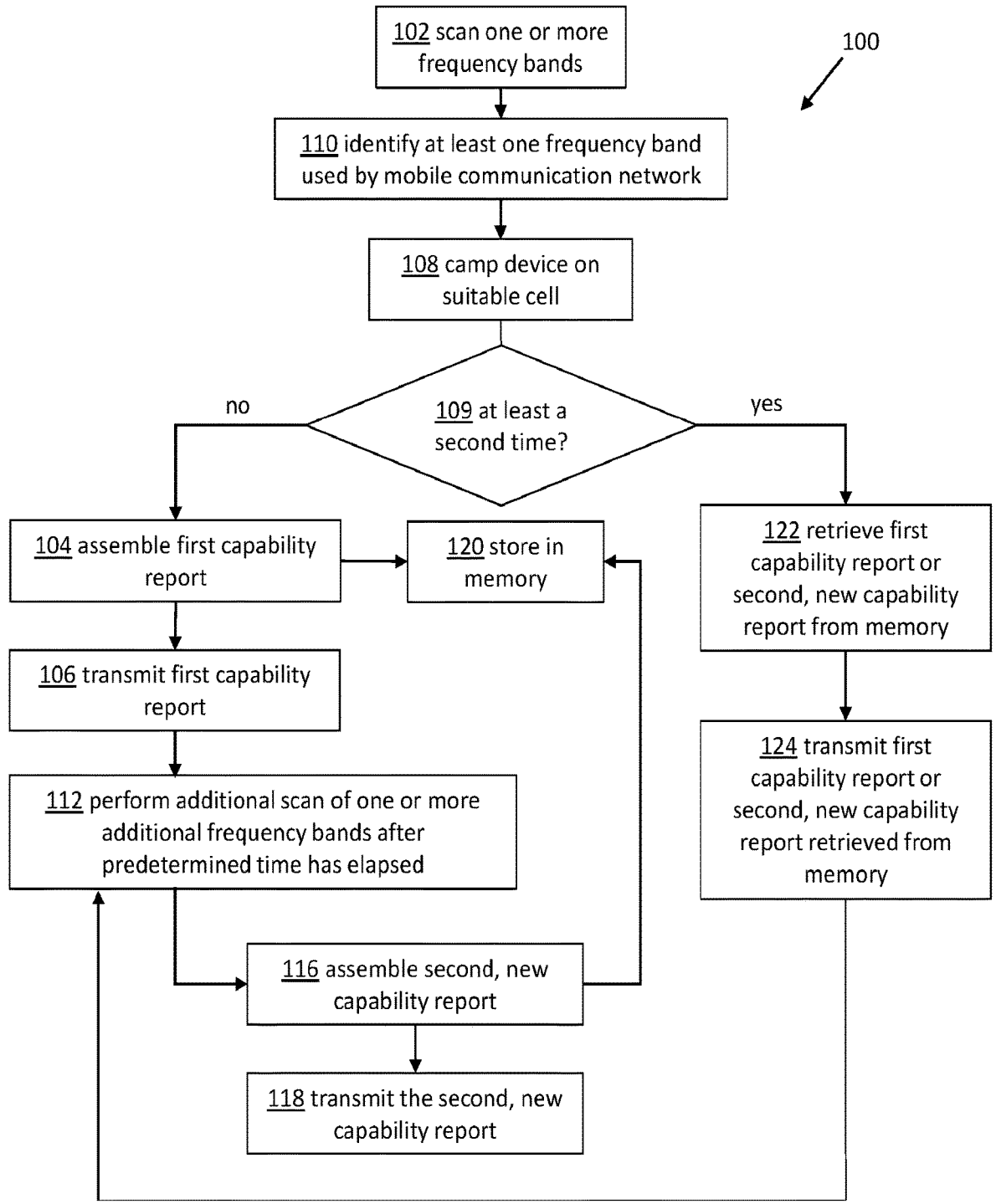
FIG. 5 is a flow diagram of an exemplary method according to an aspect of the invention.

With reference to FIG. 5, a method 100 for capability reporting of a mobile electronic device 10 in a mobile communication network, according to the present invention, is depicted. The method 100 comprises at 102, scanning one or more frequency bands. The one or more scanned frequency bands include any frequency within reach of the device 10, regardless of whether or not they are used by a particular predetermined mobile communication network in which the device 10 is to operate. The method 100 further comprises at 110, identifying at least one frequency band of the one or more scanned frequency bands that is used by the predetermined mobile communication network.

In various embodiments, the at least one frequency band identified as used by the predetermined mobile communication network may include at least two frequency bands used by two or more mobile network cells that utilize at least one common predetermined radio access technology or have a common network identity. In some embodiments, the at least two frequency bands may be used by two or more mobile network cells having both a common network identity and utilizing at least one common predetermined radio access technology.

The scanning, at 102, may include scanning the one or more frequency bands to select a suitable cell for the mobile electronic device 10 to camp on. This scanning may be according to the cell selection concept defined in TS 36.304 of the 3GPP specification. For example, the scanning may be according to the cell selection process defined in version 14.5.0 of the 3GPP specification, however other versions of the standard, other standards, or non-standard processes may be suitable for this process. Upon selecting a suitable cell, the method 100 comprises camping, at 108, the mobile electronic device 10 on the selected suitable cell in the mobile communication network.

When the mobile electronic device 10 is camped on the selected suitable cell in the mobile communication network for the first time, at 109, the method 100 comprises assembling, at 104, a first capability report based on the one or more scanned frequency bands, including all frequency bands within reach of the mobile electronic device, regardless of whether they are used by the predetermined mobile communication network in which the device 10 is to operate. Basing the first capability report on the one or more scanned frequency bands may result in a first capability report that comprises capability information indicating whether the device 10 is capable of communicating on the one or more scanned frequency bands, and/or various combinations of two or more frequency bands due to CA, wherein the combinations include at least one of the one or more scanned frequency bands. By basing the first capability report on the one or more scanned frequency bands, including capability information regarding those scanned frequency bands, the size of the first capability report may be reduced as compared to reporting capability information regarding all frequency bands that the device 10 is capable of communicating on, regardless of if they are within reach of the mobile electronic device 10 or scanned by the processor 14.

In an embodiment, the assembling, at 104, may include assembling the first capability report based more specifically on the at least one frequency band identified as used by the predetermined mobile communication network in which the device 10 is to operate. Basing the first capability report more specifically on the at least one frequency band identified as used by the predetermined mobile communication network may result in a first capability report comprising capability information indicating whether the device 10 is capable of communicating on only the frequency bands identified as used by the predetermined mobile communication network, and/or various combinations of two or more frequency bands due to CA, wherein the combinations include at least one frequency band identified as used by the predetermined mobile communication network. By basing the first capability report on the at least one frequency band identified as used by the predetermined mobile communication network and including capability information regarding those identified frequency bands, the size of the first capability report may be even more reduced as compared to reporting capability information regarding all scanned frequency bands, regardless of their use by the predetermined mobile communication network.

The method 100 comprises, at 106, transmitting the first capability report to the at least one radio network node in the predetermined mobile communication network. Over time, however, the device 10 may need to perform additional capability report updates, as described previously. For example, in one embodiment, when the device 10 changes the mobile communication network in which it operates, the method 100 may comprise repeating the steps of method 100 in a new mobile communication network. In another embodiment, the method 100 comprises performing an additional scan, at 112, of one or more additional frequency bands after a predetermined time has elapsed. Again, the predetermined time may be set to any length of time in order to consistently update the capability reporting. Upon the additional scan, at 112, the method 100 includes assembling, at 116, a second, new capability report based on the one or more additional scanned bands, at 121.

In an embodiment, the method includes identifying at least one additional frequency band of the one or more additional scanned frequency bands that is used by a predetermined mobile communication network, and assembling, at 116, the second, new capability report based more specifically on the at least one additional frequency band identified as used by the predetermined mobile communication network. The second, new capability report may comprise the same kind of information that the first capability report comprises, as previously described, including capability information indicating whether the device 10 is capable of communicating on the one or more additional scanned frequency bands, individually or in combination with one or more other frequency band. Alternatively, the second, new capability report may comprise capability information indicating whether the device 10 is capable of communicating on only the at least one additional frequency band identified as used by the predetermined mobile communication network, individually or in combination with one or more other frequency band. The method 100 then comprises, at 118, transmitting the second, new capability report to the at least one radio network node in the mobile communication network.

In an embodiment, the method 100 may comprise storing, at 120, the first capability report and/or the second, new capability report in a memory 16 on the mobile electronic device 10. When the mobile electronic device 10 is camped on the selected suitable cell for at least a second time, at 109, the method 100 may then comprise retrieving, at 122, the first capability report or the second, new capability report from the memory 16. The method 100 may then comprise transmitting, at 124, the first capability report or the second, new capability report retrieved from the memory 16 to the at least one radio network node in the mobile communication network.

In an embodiment, a non-transitory computer-readable medium storing program code is provided, which when executed, performs the method 100.

Figure 6:
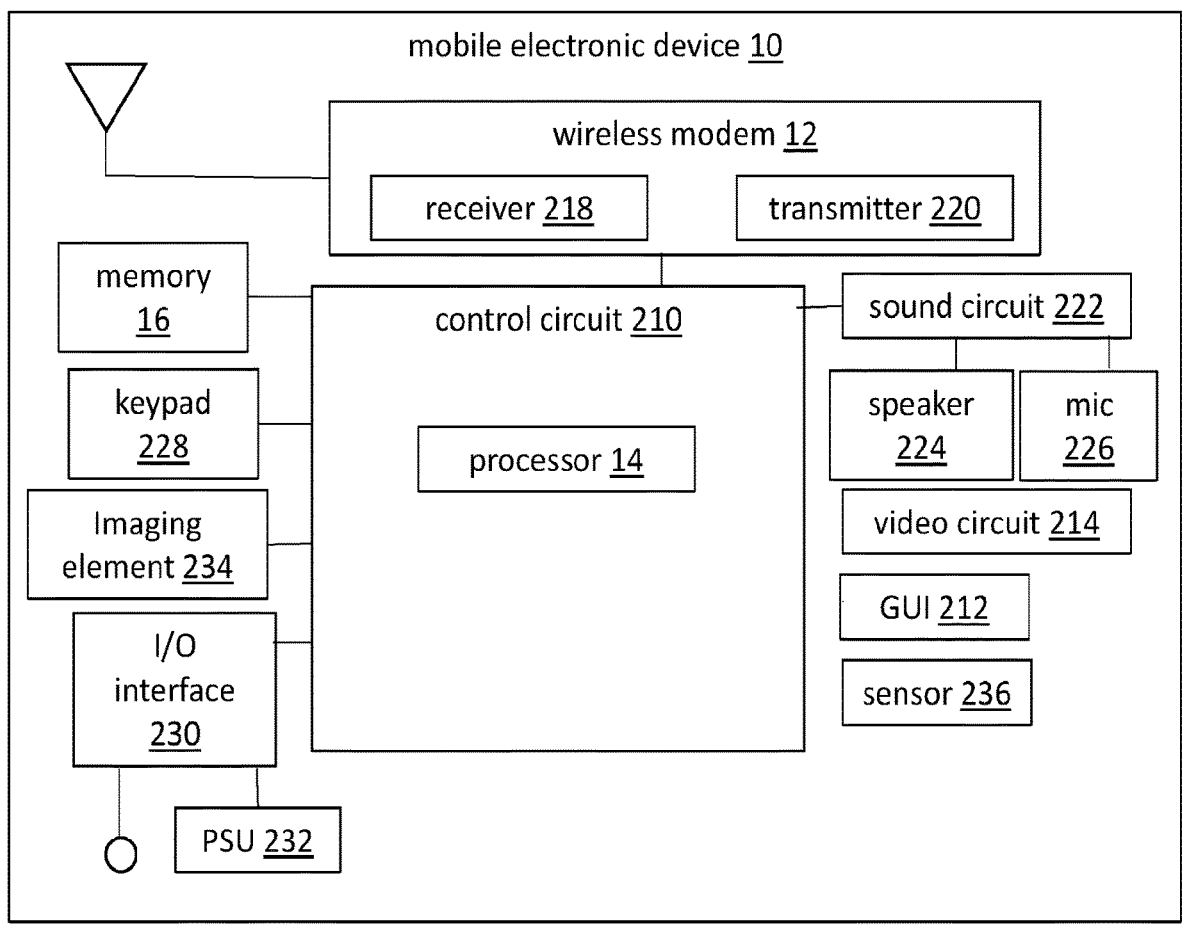
FIG. 6 is a schematic block diagram of a mobile electronic device.

FIG. 6 illustrates a detailed schematic block diagram of an exemplary mobile electronic device 10. The device 10 includes a control circuit 210 that is responsible for overall operation of the device 10. For this purpose, the control circuit 210 includes the processor 14 that executes various applications, including applications related to or that form part of the device 10 functioning as described above in reference to FIGS. 3-5. In one embodiment, functionality of the device 10 described above in reference to FIGS. 3-5 are embodied in the form of executable logic (e.g., lines of code, software, or a program) that is stored in the memory 16, which may be a non-transitory computer readable medium of the device 10, and is executed by the processor 14. The described operations may be thought of as a method that is carried out by the device 10. Variations to the illustrated and described techniques are possible and, therefore, the disclosed embodiments should not be considered the only manner of carrying out device 10 functions. The processor 14 and the executable logic may be implemented in the device 10 as hardware, firmware, software, or combinations thereof, and thus, the device 10 and its components provide means for performing functions described herein as performed or executed by the processor 14.

The device 10 may further include a GUI 212, which may be coupled to the processor 14 by a video circuit 214 that converts video data to a video signal used to drive the GUI 212. The video circuit 214 may include any appropriate buffers, decoders, video data processors and so forth.

The device 10 further includes communications circuitry that enables the device 10 to establish communication connections such as a telephone call. In the exemplary embodiment, the communications circuitry includes a radio circuit, such as the wireless modem 12. The wireless modem 12 includes one or more radio frequency transceivers including the receiver 218, the transmitter 220 and an antenna assembly (or assemblies). The device 10 may be capable of communicating using more than one standard or radio access technology (RAT). Thus, the wireless modem 12 including the receiver 218 and the transmitter 220 represents each radio transceiver and antenna needed for the various supported connection types. The wireless modem 12 including the receiver 218 and the transmitter 220 further represents any radio transceivers and antennas used for local wireless communications directly with an electronic device, or over a Bluetooth interface.

As indicated, the device 10 includes the primary control circuit 210 that is configured to carry out overall control of the functions and operations of the device 10. The processor 14 of the control circuit 210 may be a central processing unit (CPU), microcontroller or microprocessor. The processor 14 executes code stored in a memory within the control circuit 210 and/or in a separate memory, such as the memory 16, in order to carry out operation of the device 10. The memory 16 may be, for example, one or more of a buffer, a flash memory, a hard drive, a removable media, a volatile memory, a non-volatile memory, a random-access memory (RAM), or other suitable device. In a typical arrangement, the memory 16 includes a non-volatile memory for long term data storage and a volatile memory that functions as system memory for the control circuit 210. The memory 16 may exchange data with the control circuit 210 over a data bus. Accompanying control lines and an address bus between the memory 16 and the control circuit 210 also may be present. The memory 16 is considered a non-transitory computer readable medium.

The device 10 may further include a sound circuit 222 for processing audio signals. Coupled to the sound circuit 222 are a speaker 224 and a microphone 226 that enable a user to listen and speak via the device 10, and hear sounds generated in connection with other functions of the device 10. The sound circuit 222 may include any appropriate buffers, encoders, decoders, amplifiers and so forth.

The device 10 may further include a keypad 228 that provides for a variety of user input operations. The device 10 may further include one or more input/output (I/O) interface(s) 230. The I/O interface(s) 230 may be in the form of typical electronic device I/O interfaces and may include one or more electrical connectors for operatively connecting the device 10 to another device (e.g., a computer) or an accessory (e.g., a personal handsfree (PHF) device) via a cable. Further, operating power may be received over the I/O interface(s) 230 and power to charge a battery of a power supply unit (PSU) 232 within the device 10 may be received over the I/O interface(s) 230. The PSU 232 may supply power to operate the device 10 in the absence of an external power source.

The device 10 also may include various other components. For instance, the imaging element 234 may be present for taking digital pictures and/or movies. Image and/or video files corresponding to the pictures and/or movies may be stored in the memory 16. As another example, various sensors 236 may be present to sense various sensor data.

Although the invention has been shown and described with respect to certain preferred embodiments, it is understood that equivalents and modifications will occur to others skilled in the art upon the reading and understanding of the specification. The present invention includes all such equivalents and modifications and is limited only by the scope of the following claims.

What is claimed is:

1. A mobile electronic device comprising:
   a wireless modem, and
   a processor configured to:
      cause the wireless modem to scan one or more frequency bands to select a suitable cell for the mobile electronic device to camp on,
      upon selecting the suitable cell cause the mobile electronic device to camp on the selected suitable cell,
      assemble a first capability report based on the one or more scanned frequency bands, and
      cause the wireless modem to transmit the first capability report to at least one network node in a mobile communication network,
   wherein the processor comprises a memory configured to store the first capability report, and
   wherein when the processor causes the mobile electronic device to camp on the selected suitable cell for at least a second time, the processor is further configured to:
      retrieve the first capability report from the memory, and
      cause the wireless modem to transmit the first capability report retrieved from the memory.

2. The mobile electronic device of claim 1, wherein the first capability report comprises capability information indicating whether the mobile electronic device is capable of communicating on:
   a) the one or more scanned frequency bands, and/or
   b) at least one combination of two or more frequency bands, the at least one combination including at least one of the one or more scanned frequency bands.

3. The mobile electronic device of claim 1, wherein the processor is configured to:
   identify at least one frequency band of the one or more scanned frequency bands that is used by a predetermined mobile communication network, and
   assemble the first capability report based on the at least one frequency band identified as used by the predetermined mobile communication network.

4. The mobile electronic device of claim 3, wherein the first capability report comprises capability information indicating whether the mobile communication device is capable of communicating on only:
   a) the at least one frequency band identified as used by the predetermined mobile communication network, and/or
   b) at least one combination of two or more frequency bands, the at least one combination including at least one of the at least one frequency band identified as used by the predetermined mobile communication network.

5. The mobile electronic device of claim 3, wherein the at least one frequency band identified as used by the predetermined mobile communication network includes at least two frequency bands used by two or more mobile network cells having a common network identity.

6. The mobile electronic device of claim 3, wherein the at least one frequency band identified as used by the predetermined mobile communication network includes at least two frequency bands used by two or more mobile network cells utilizing at least one common predetermined radio access technology.

7. The mobile electronic device of claim 1 wherein the processor is configured to;
   perform an additional scan of one or more additional frequency bands after a predetermined time has elapsed,
   assemble a second, new capability report based on the one or more additional scanned frequency bands, and
   cause the wireless modem to transmit the second, new capability report.

8. The mobile electronic device of claim 7, wherein the memory is configured to store the second, new capability report on the mobile electronic device.

9. The mobile electronic device of claim 8 wherein when the processor causes the mobile electronic device to camp on the selected suitable cell for at least the second time, the processor is configured to:
   retrieve the first capability report or the second, new capability report from the memory, and
   cause the wireless modem to transmit the first capability report or the second, new capability report retrieved from the memory.

10. A method for capability reporting of a mobile electronic device, the method comprising:
   scanning one or more frequency bands to select a suitable cell for the mobile electronic device to camp on,
   upon selecting the suitable cell, causing the mobile electronic device to camp on the selected suitable cell,
   assembling a first capability report based on the one or more scanned frequency bands, and
   transmitting the first capability report to at least one network node in a mobile communication network,
   wherein when the mobile electronic device is camped on the selected suitable cell for at least a second time, the method further comprises:
      retrieving the first capability report from a memory on the mobile electronic device, and
      transmitting the first capability report retrieved from the memory.

11. The method of claim 10, wherein the first capability report comprises capability information indicating whether the mobile electronic device is capable of communicating on:
   a) the one or more scanned frequency bands, and/or
   b) at least one combination of two or more frequency bands, the at least one combination including at least one of the one or more scanned frequency bands.

12. The method of claim 10, further comprising identifying at least one frequency band of the one or more scanned frequency bands that is used by a predetermined mobile communication network, wherein the assembling comprises assembling the first capability report based on the at least one frequency band identified as used by the predetermined mobile communication network.

13. The method of claim 12, wherein the first capability report comprises capability information indicating whether the mobile communication device is capable of communicating on only:
   a) the at least one frequency band identified as used by the predetermined mobile communication network, and/or
   b) at least one combination of two or more frequency bands, the at least one combination including at least one of the at least one frequency band identified as used by the predetermined mobile communication network.

14. The method of claim 12, wherein the at least one frequency band identified as used by the predetermined mobile communication network includes at least two frequency bands used by two or more mobile network cells that:
   a) utilize at least one common predetermined radio access technology, or
   b) have a common network identity.

15. The method of claim 10 further comprising:
   performing an additional scan of one or more additional frequency bands after a predetermined time has elapsed,
   assembling a second, new capability report based on the one or more additional scanned frequency bands, and
   transmitting the second, new capability report.

16. The method of claim 15 further comprising storing the second, new capability report in the memory on the mobile electronic device.

17. The method of claim 16 wherein when the mobile electronic device is camped on the selected suitable cell for at least the second time, the method further comprises:
   retrieving the first capability report or the second, new capability report from the memory, and
   transmitting the first capability report or the second, new capability report retrieved from the memory.

18. A non-transitory computer-readable medium storing program code which when executed performs the method of claim 10.

\* \* \* \* \*